(12) United States Patent
Hwang

(10) Patent No.: US 7,659,829 B2
(45) Date of Patent: Feb. 9, 2010

(54) METHOD OF IMPROVING THE DETECTION OF OPENING AND CLOSING OF A SLIDE-TYPE MOBILE COMMUNICATION TERMINAL AND AN APPARATUS THEREOF

(75) Inventor: Byung-Hun Hwang, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 287 days.

(21) Appl. No.: 11/512,919

(22) Filed: Aug. 30, 2006

(65) Prior Publication Data

US 2007/0088758 A1   Apr. 19, 2007

(30) Foreign Application Priority Data

Sep. 9, 2005   (KR)   ...................... 10-2005-0084210

(51) Int. Cl.
*G08B 21/00* (2006.01)
(52) U.S. Cl. ............... 340/686.1; 455/575.1; 455/575.4
(58) Field of Classification Search ............. 340/686.1, 340/547, 545.6; 455/425, 575.1, 575.4; 200/61.71–61.75
See application file for complete search history.

(56) References Cited

U.S. PATENT DOCUMENTS

| | | | | |
|---|---|---|---|---|
| 6,389,301 | B1 * | 5/2002 | Furuya | .................... 455/575.4 |
| 7,286,862 | B2 * | 10/2007 | Lee et al. | .................. 455/575.4 |
| 7,353,049 | B2 * | 4/2008 | Mizuta | ..................... 455/575.3 |
| 7,363,065 | B2 * | 4/2008 | Lee | ........................... 455/575.3 |
| 2004/0198437 | A1 | 10/2004 | Yamamoto et al. | |
| 2004/0198477 | A1 | 10/2004 | Jung et al. | |
| 2005/0049017 | A1 * | 3/2005 | Yoda | ........................ 455/575.1 |
| 2005/0288076 | A1 * | 12/2005 | Seol | ......................... 455/575.4 |

FOREIGN PATENT DOCUMENTS

CN   1461134   12/2003

\* cited by examiner

*Primary Examiner*—John A Tweel, Jr.
(74) *Attorney, Agent, or Firm*—The Farrell Law Firm, LLP

(57) ABSTRACT

An apparatus for detecting the opening and closing of a slide-type mobile communication terminal having a main body and a sub-body mounted on the main body. The apparatus includes a signal generating element of bar-type provided in the sub-body for generating a predetermined signal; a first and a second signal sensor provided at two positions separated by a predetermined interval in the main body so as to face the signal generating element respectively when the sub-body is slid up and down relative to the main body, the first and second signal sensors detecting the predetermined signal; and a control unit for performing corresponding functions according to the opening and closing operations of the mobile communication terminal represented by different signals generated by the first and second signal sensors.

20 Claims, 6 Drawing Sheets

|   | FIRST SIGNAL SENSOR | SECOND SIGNAL SENSOR | STATE |
|---|---|---|---|
| 1 | HIGH | LOW | Close |
| 2 | LOW | LOW | Don't care |
| 3 | LOW | HIGH | Open |
| 4 | HIGH | HIGH | Don't care |

FIG.6

METHOD OF IMPROVING THE DETECTION OF OPENING AND CLOSING OF A SLIDE-TYPE MOBILE COMMUNICATION TERMINAL AND AN APPARATUS THEREOF

PRIORITY

This application claims priority under 35 U.S.C. § 119 to an application entitled "Method of Improving the Detection of Opening and Closing of a Mobile Communication Terminal of Slide-Type and an Apparatus Therefor" filed in the Korean Intellectual Property Office on Sep. 9, 2005 and assigned Serial No. 2005-84210, the contents of which are incorporated herein by reference.

BACKGROUND OF THE INVENTION

1. Field of the Invention

The present invention relates generally to a slide-type mobile communication terminal having a main body and a sub-body mounted on the main body. The sub-body is movable relative to the main body in a sliding manner between the open position, where the sub-body is slid up so as to expose a part of the main body, and the closed position where the sub-body is slid down to completely cover the main body. The present invention more particularly relates to a method of improving the detection of the opening and closing of the terminal.

2. Description of the Related Art

Recently the portable mobile communication terminal such as mobile phone, Personal Communication Service (PCS), and Personal Digital Assistant (PDA) has undergone significant changes and modifications in design and functions in order to meet the user's various needs and desires in addition to the basic communication function. Conventionally, the design of the mobile communication terminal has been changed from the bar-type exposing the keypad through the flip and fold types with a cover protecting the keypad and finally to the slide-type.

Referring to FIG. 1 for illustrating a conventional slide-type mobile communication terminal having a main body and a sub-body, the closing of the terminal is made by sliding the sub-body completely down over the main body as shown in FIG. 1A. The opening is performed by sliding the sub-body completely up the main body as shown in FIG. 1B. As shown in the drawing, the conventional slide-type detects the opening and closing by means of a single Hall sensor 110. The Hall sensor is provided in the main body with a battery attached thereto, and a magnetic field generating element 100 in the sub-body with a speaker and a display part.

In operation, if the sub-body is slid up the main body from the position as shown in FIG. 1A to the position as shown in FIG. 1B, the Hall sensor 110 cannot be affected with the magnetic field of the magnetic field generating element 100, thus generating a high signal delivered to a control unit, such as a CPU (not shown). Receiving the high signal, the control unit recognizes the opening of the terminal indicating the sub-body has slid up the main body.

In such a conventional slide-type, if an unwanted magnetic field (caused by a foreign matter such as a snap magnet button attached to a case for enclosing the mobile communication terminal) occurs around the Hall sensor, the Hall sensor may produce an error signal causing the terminal to operate abnormally. Such a foreign magnetic field does not significantly affect a folder-type with the Hall sensor arranged toward the center, but significantly affects the slide-type with the Hall sensor arranged toward the outside to avoid the metallic slide hinge. Namely, as the Hall sensor is arranged toward the outside, the possibility of its being exposed to a foreign magnetic field is increased.

Moreover, in order to prevent the terminal from operational changes when the sub-body is not completely slid up or down the main body, the magnetic field generating element such as a magnet is designed to have a length about half the sliding distance. If the magnet has a shorter length, the effective range of the magnetic field becomes narrower, so that the slide-type terminal operates in a way sensitive to a small movement of the sub-body.

As described above, the conventional slide-type terminal has a single Hall sensor attached as far toward the outside as possible, which is easily exposed to a foreign magnetic field and may cause abnormal operation. In addition, since the magnet provided in the sub-body has a length about half the sliding distance, the length of the magnet is increased proportional to the length dimension of the terminal, thus increasing the risk of the magnet being broken at its center.

SUMMARY OF THE INVENTION

It is an object of the present invention to provide a method and apparatus for making a quick and precise detection of the opening and closing of a mobile communication terminal of slide type without causing the terminal to operate abnormally when the sub-body is slid up or down the main body under a foreign magnetic field.

According to an aspect of the present invention, an apparatus is provided for detecting the opening and closing of a slide-type mobile communication terminal having a main body and a sub-body mounted on the main body, the sub-body being movable relative to the main body in a sliding manner between the opening position where the sub-body slides up so as to expose a part of the main body and the closing position where the sub-body slides down to completely cover the main body. The apparatus includes a signal generating element of bar-type provided in the sub-body for generating a predetermined signal; a first and a second signal sensor provided at two positions separated by a predetermined interval in the main body so as to face the signal generating element respectively when the sub-body is slid up and down relative to the main body, the first and second signal sensors detecting the predetermined signal; and a control unit for performing corresponding functions according to the opening and closing operations of the mobile communication terminal represented by different signals generated by the first and second signal sensors.

According to another aspect of the present invention, an apparatus is provided for detecting the opening and closing of a slide-type mobile communication terminal having a main body and a sub-body mounted on the main body, the sub-body being movable relative to the main body in a sliding manner between the opening position where the sub-body slides up so as to expose a part of the main body and the closing position where the sub-body completely covers the main body. The apparatus includes a signal generating element of bar-type provided in the sub-body for generating a magnetic field; a first and a second signal sensor provided at two positions separated by a predetermined interval in the main body so as to face the signal generating element respectively when the sub-body is slid up and down relative to the main body, the first and second signal sensors generating low or high signal according to the magnetic field detected or not; and a control unit for performing corresponding functions according to the opening and closing operations of the mobile communication terminal represented by different signals generated by the first and second signal sensors.

According to still another aspect of the present invention, a method is provided for improving the detection of opening and closing a slide-type mobile terminal, which including a main body, a sub-body mounted on the main body, the sub-body being movable relative to the main body in a sliding manner between the opening position where the sub-body slides up so as to expose a part of the main body and the closing position where the sub-body slides down to completely cover the main body, and a signal generating element of bar-type provided in the sub-body for generating a magnetic field. The method includes the steps of providing the main body with a first and a second signal sensor provided at two positions separated by a predetermined interval in the main body so as to face the signal generating element respectively when the sub-body is slid up and down relative to the main body, the first and second signal sensors detecting the magnetic field; determining whether a signal is received from the first signal sensor; determining whether a signal is received from the second signal sensor if there is a signal received from the first signal sensor; and recognizing the opening and closing of the mobile communication terminal to perform corresponding functions if there is a signal received from the second signal sensor.

BRIEF DESCRIPTION OF THE DRAWINGS

The above and other objects, features and advantages of the present invention will become more apparent from the following detailed description when taken in conjunction with the accompanying drawing in which:

FIG. 6 is a reference table used for detecting the opening and closing of a slide-type mobile communication terminal according to the present invention.

DETAILED DESCRIPTION OF THE PREFERRED EMBODIMENT

Figure 1A:
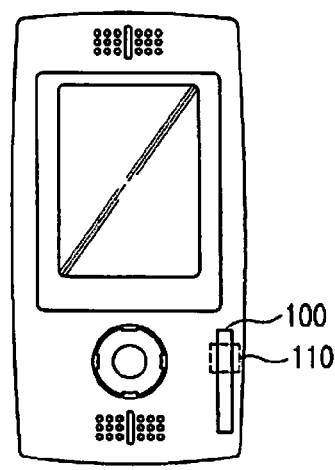
FIGS. 1A and 1B are plane views of a slide-type mobile communication terminal for respectively showing the sub-body slid down and up the main body.
Figure 1B:
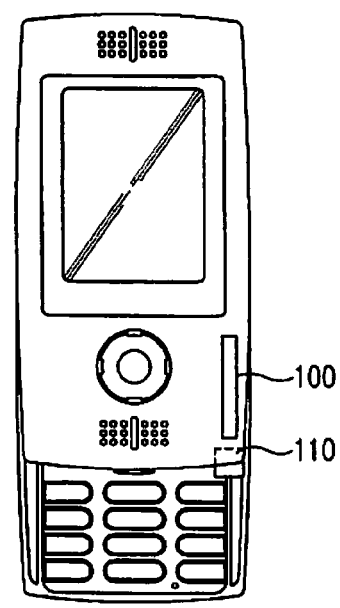

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The inventive slide-type mobile communication terminal includes two signal sensors provided in the main body attached with a battery, and a signal generating element provided in the sub-body with a display, which enable a quick, precise detection of the opening and closing.

Generally, the housing of a slide-type mobile communication terminal includes two parts respectively called the main body with a battery and the sub-body with a display. The sub-body is mounted on the main body so as to slide up or down the main body in order to open or close the mobile communication terminal. It will be noted throughout this description that the opening and closing of the mobile terminal are done by sliding the sub-body up and down the main body. Thus, the opening of the sub-body means the sub-body slides up the main body, and the closing the sub-body means the sub-body slides down the main body.

The opening and closing of the sub-body are detected by the Hall sensor to generate logically a low or a high signal according to whether the sensor is in a magnetic field. Accordingly the slide-type mobile communication terminal recognizes the opening or closing according to the signal generated from the Hall sensor. However, since the Hall sensor is provided toward the outside of the main body, there occurs a problem that it is easily affected by a foreign magnetic field. This problem is resolved by the present invention that enables the slide-type mobile communication terminal to precisely detect the opening and closing without malfunctioning.

Figure 2:
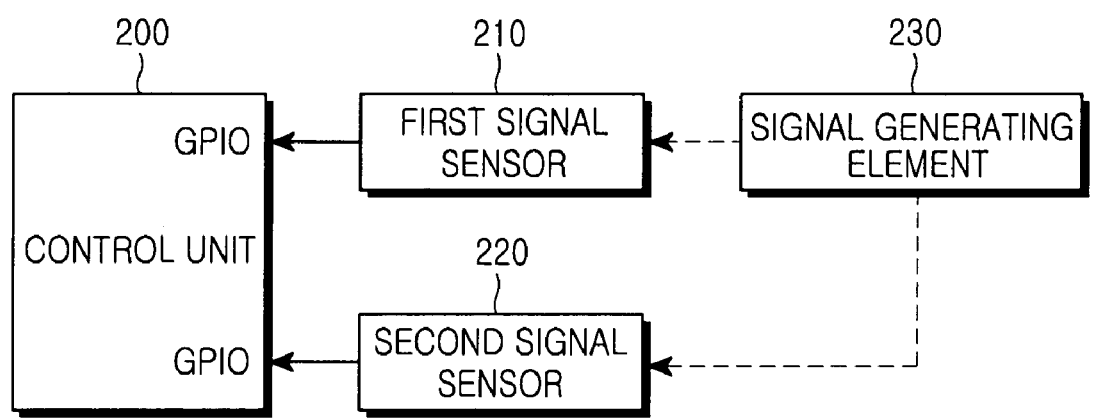
FIG. 2 is a block diagram for illustrating the internal structure of a slide-type mobile communication terminal according to the present invention.

Referring to FIG. 2, the inventive slide-type mobile communication terminal includes a signal generating element 230 for generating a signal like a magnetic field, a first and a second signal sensor 210 and 220 for detecting the signal generated from the signal generating element according to the sliding up/down of the sub-body, and a control unit 200 for performing functions corresponding to the opening and closing of the sub-body represented by the signals generated by the first and second signal sensors.

The signal generating element 230 may consist of a bar-type magnet element provided in the sub-body. According to the present invention, the bar-type signal generating element 230 is designed to have a shorter length than the conventional one so as to generate a signal precisely directed to the two signal sensors 210 and 220 when the sub-body slides up or down. Of course, the signal generating element 230 may be made of any device capable of generating a magnetic field of a given strength.

The first and second signal sensors 210 and 220 are made of Hall sensor elements with the same form, the same size and the same function. The first and second signal sensors 210 and 220 generate the low signal if detecting the signal from the signal generating element 230, or the high signal if not detecting the signal. The low and high signals are delivered to the control unit 200.

Then, based on the low and high signals from the first and second signal sensors 210 and 220, the control unit 200 determines whether the sub-body is opened or closed. In this embodiment, if the first and second signal sensors 210 and 220 generate the same type of signals that are low or high, the control unit 200 performs the procedure of "Don't care." Alternatively, if the first and second signal sensors 210 and 220 generate different types of signals (one signal is low and one signal high), the control unit 200 recognizes that the position of the sub-body has been changed.

Figure 3A:
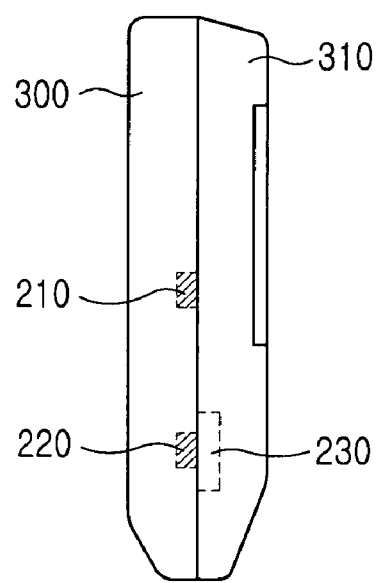
FIGS. 3A and 3B are a side and a plane view for showing the closing of a slide-type mobile communication terminal with the sub-body being slid down the main body, according to the present invention.
Figure 3B:
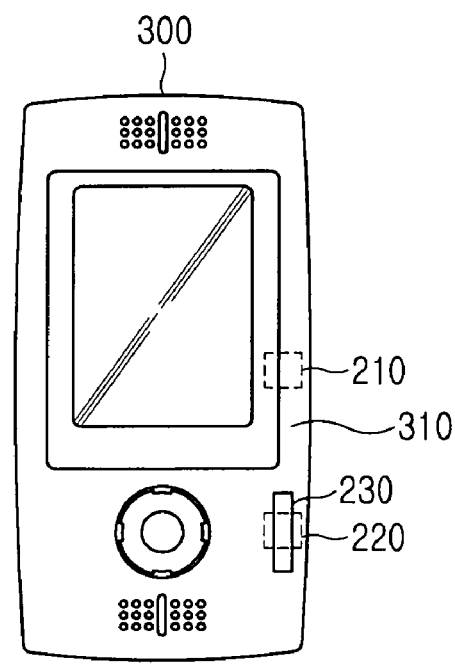
Figure 4A:
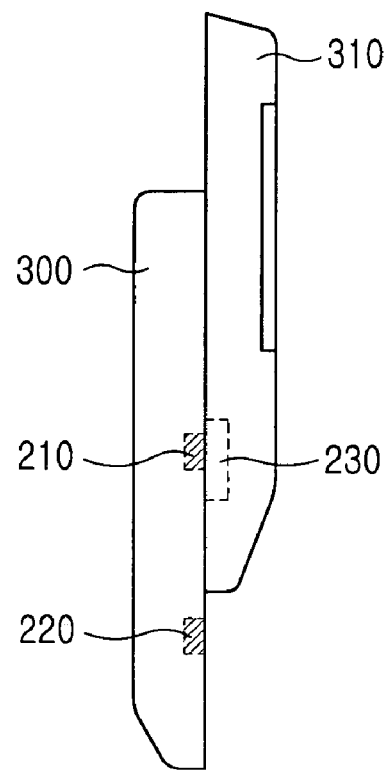
FIGS. 4A and 4B are a side and a plane view for showing the opening of a slide-type mobile communication terminal with the sub-body being slid up the main body, according to the present invention.
Figure 4B:
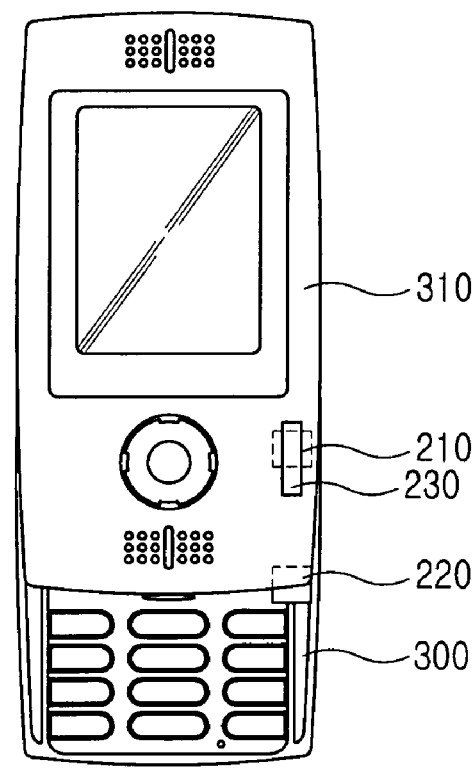

Hereinafter is described the operation of the inventive slide-type mobile communication terminal in connection with FIGS. 3A and 3B showing the closing of the sub-body and FIGS. 4A and 4B showing the opening of the sub-body.

Referring to FIG. 3A, the first and second signal sensors 210 and 220 are separately arranged with a given interval in the main body so as to directly face the signal generating element 230 respectively when the sub-body slides up and down. More specifically, the second signal sensor 220 is arranged so as to directly face the signal generating element 230 when the sub-body 310 slides down to completely cover the main body 300. In this case, the spacing between the first and second signal sensors 210 and 220 is designed to have a length sufficient that the signal generating element 230 cannot affect the first signal sensor 210 when the sub-body 310 slides down the main body 300 or affect the second signal sensor 220 when the sub body 310 slides up the main body 300.

Hence, referring to FIG. 3B for showing the second signal sensor 220 directly facing the signal generating element 230, the magnetic field of the signal generating element 230 affects only the second signal sensor 220, so that the second signal sensor generates the low signal, and the first signal sensor 210 the high signal. Therefore receiving high signal from the first signal sensor 210 and low signal from the second signal sensor 220, the control unit 200 recognizes that the sub-body has been slid down to completely cover the main body. In this state, even if a foreign magnetic field affects the first signal sensor 210 to generate a low signal, the control unit 200 takes no action because the two signal sensors generate the same low signal.

Referring to FIGS. 4A and 4B respectively showing a side and a plane view of the sub-body being slid up the main body, the signal generating element 230 is separately arranged in the sub-body 310 so that the signal generating element 230 affects the first signal sensor 210 or the second signal sensor 220 arranged in the main body 300 along with a movement of the sub-body 310 when the sub-body 310 slides up the main body 300, as shown in FIG. 4A. The opening of the mobile terminal is accomplished by completely sliding the sub-body 310 up the main body 300 so that the signal generating element 230 directly faces the first signal sensor 210. Thus, the magnetic field of the signal generating element 230 may affect only the first signal sensor 210.

If the sub-body 310 is not completely slid up the main body 300 for the signal generating element 230 not to affect both the first and the second signal sensor 210 and 220 with the magnetic field, the first and second signal sensors 210 and 220 generate the same high signal delivered to the control unit 200. Thus receiving the two high signals, the control unit 200 recognizes that the sub-body 310 has not been completely slid up the main body. Then the control unit 200 performs the procedure of "Don't care" because the two signal sensors generate the same high signal.

However, if the sub-body 310 is completely slid up the main body as shown in FIG. 4B, the signal generating element 230 directly faces the first signal sensor 210 to be affected with the magnetic field, so that the first signal sensor 210 generates the low signal, and the second signal sensor 220 generates the high signal because it is not affected by the magnetic field. Then, the control unit 200 recognizes that the mobile communication terminal is opened by the sub-body being slid up the main body. Subsequently the control unit 200 performs corresponding functions by displaying a standby message, etc.

As described above, it is required that the signal generating element 230 be arranged so as to directly face only the first signal sensor 210 when the sub-body 310 slides up the main body 300, and to directly face only the second signal sensor 220 when the sub-body slides down the main body. In addition, the magnet of the signal generating element 230 should have a length short enough to only affect one of the two signal sensors according to whether the sub-body slides up or down the main body.

Figure 5:
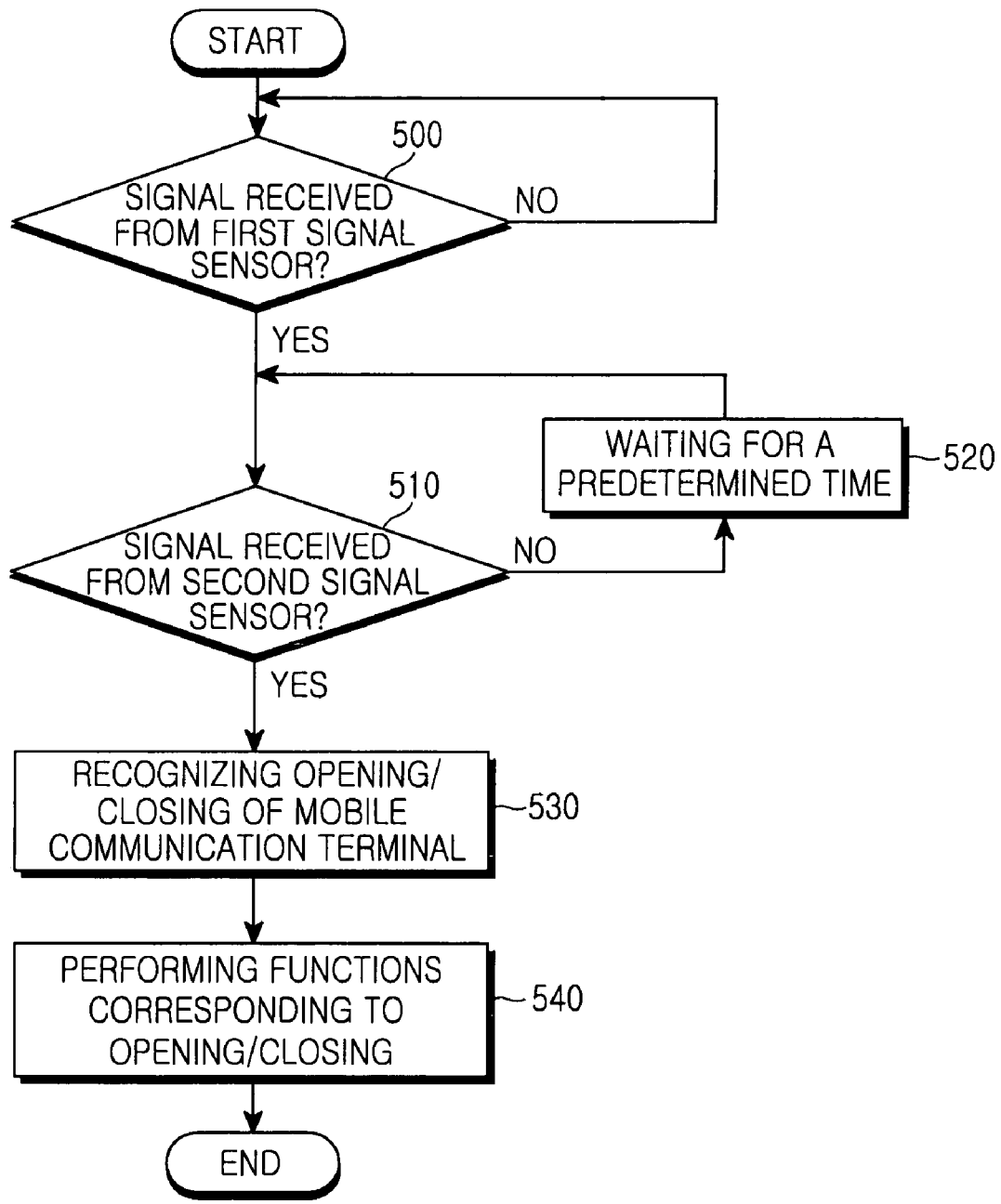
FIG. 5 is a flowchart illustrating a procedure for detecting the opening and closing of a slide-type mobile communication terminal according to the present invention.

Describing the operation of the inventive slide-type mobile communication terminal in connection with the flowchart of FIG. 5, the control unit 200 determines in step 500 whether the first signal sensor 210 generates a signal. Receiving the signal, the control unit 200 goes to step 510 to determine whether the second signal sensor 220 generates a signal. In this case, the two signal sensors 210 and 220 generate signals only when the state of the mobile terminal is changed by the sub-body sliding up or down, so that the control unit 200 may detect the opening or closing of the mobile terminal.

If the control unit 200 does not receive the signal from the second signal sensor 220 in step 510 after receiving the signal from the first signal sensor 210, it makes a decision that the sub-body 310 has not yet been slid up or down, going to step 520 to wait for a predetermined time. At this moment, the control unit 200 may display a message, requesting the user to slide the sub-body 310 completely up or down the main body. Thereafter, the control unit 200 returns to step 510 to determine whether the second signal sensor 220 generates the signal. Receiving the signal, the control unit 200 goes to step 530 to detect the opening/closing operation. Namely, since the first and second signal sensors 210 and 220 generate the signals only when the state of the mobile terminal is changed by the sliding operation, the control unit 200 recognizes the opening/closing of the sub-body by detecting these signals. Finally, the control unit 200 goes to step 540 to perform the functions corresponding to the opening or closing. In this case, the control unit 200 refers to the table as shown in FIG. 6 to determine whether the mobile communication terminal is opened or closed with the sub-body sliding up or down the main body.

Referring to FIG. 6, the closing is represented by both the high signal from the first signal sensor 210 and the low signal from the second signal sensor 220. In this state, even if the first and second-signal sensors 210 and 220 are affected by a foreign magnetic field, unwanted signal changes do not occur because the second signal sensor 220 has already been generating low signal. Further, if the first signal sensor 210 generates low signal because of a foreign magnetic field, the control unit 200 takes no action because both of the two signal sensors 210 and 220 generate the same low signal. Likewise, if the two signal sensors are affected by a foreign magnetic field in the opening state, they generate the same type of signal, so that the control unit 200 performs the procedure of "Don't care" to prevent errors.

As described above, the invention provides the slide-type mobile communication terminal with the first and second signal sensors 210 and 220 whose signals are used by the control unit 200 to make a precise detection of the opening or closing of the sub-body. Furthermore, even if the two signal sensors are affected by a foreign magnetic field, the mobile communication terminal is prevented from being erratically operated. In addition, since the magnet of the signal generating element has a shorter length than the conventional one, it may be detected precisely whether the sub-body has been completely slid up or down the main body, thus significantly decreasing the possibility of mistaking the opening or closing.

While the invention has been shown and described with reference to a certain preferred embodiment thereof, it will be understood by those skilled in the art that various changes in form and details may be made therein without departing from the spirit and scope of the invention.

What is claimed is:

1. An apparatus for detecting an opening and a closing of a slide-type mobile communication terminal having a main body and a sub-body mounted on said main body, said sub-body being movable relative to said main body in a sliding manner between the open position where said sub-body slides up so as to expose a part of said main body and the closed position where said sub-body slides down to completely cover said main body, comprising:

a signal generating element provided in said sub-body for generating a predetermined signal;

a first and a second signal sensor provided at two positions separated by a predetermined interval in said main body so as to face said signal generating element respectively when said sub-body slides up and down relative to said main body, said first and second signal sensors detecting said predetermined signal; and a control unit for performing corresponding functions according to the opening and closing operations of said mobile communication terminal represented by different signals generated by said first and second signal sensors, the control unit detecting a relative position of the sub-body and the main body in one of a first position, a second position, and a transition position, the first position corresponding to the sub-body fully slid up, the second position corresponding to the sub-body fully slid down, and the transition position being between the first and second positions.

2. An apparatus as defined in claim 1, wherein said second signal sensor is arranged so as to directly face said signal generating element with said sub-body completely covering said main body.

3. An apparatus as defined in claim 1, wherein said first signal sensor is arranged so as to directly face said signal generating element with said sub-body being completely slid up the main body.

4. An apparatus as defined in claim 1, wherein said signal generating element is made of a magnet bar producing a magnetic field.

5. An apparatus as defined in claim 4, wherein said magnet bar has a length designed for only one of said first and second signal sensors to be affected by said magnetic field in the opening or closing position.

6. An apparatus as defined in claim 1, wherein said first and second signal sensors are made of Hall sensor elements with the same form, the same size and the same function.

7. An apparatus as defined in claim 1, wherein said control unit recognizes the opening position of said sub-body sliding up if detecting a low signal from said first signal sensor and a high signal from said second signal sensor.

8. An apparatus as defined in claim 1, wherein said control unit recognizes the closing position of said sub-body sliding down if detecting a high signal from said first signal sensor and a low signal from said second signal sensor.

9. An apparatus as defined in claim 1, wherein said control unit performs a procedure of "Don't care" if detecting the same signal, high or low, from both of said first and second signal sensors.

10. An apparatus for detecting an opening and a closing of a slide-type mobile communication terminal having a main body and a sub-body mounted on said main body, said sub-body being movable relative to said main body in a sliding manner between the open position where said sub-body slides up so as to expose a part of said main body and the closed position where said sub-body completely covers said main body, comprising:

a signal generating element of bar-type provided in said sub-body for generating a magnetic field;

a first and a second signal sensor provided at two positions separated by a predetermined interval in said main body so as to face said signal generating element respectively when said sub-body slides up and down relative to said main body, said first and second signal sensors generating a low or a high signal according to whether said magnetic field is detected; and a control unit for performing corresponding functions according to the opening and closing operations of said mobile communication terminal represented by different signals generated by said first and second signal sensors, the control unit detecting a relative position of the sub-body and the main body in one of a first position, a second position, and a transition position, the first position corresponding to the sub-body fully slid up, the second position corresponding to the sub-body fully slid down, and the transition position being between the first and second positions.

11. An apparatus as defined in claim 10, wherein said signal generating element is made of a magnet bar producing a magnetic field.

12. An apparatus as defined in claim 11, wherein said magnet bar has a length designed so that when said sub-body slides up said main body, only said first signal sensor may face said magnet bar, and said second signal sensor may not be affected by said magnetic field.

13. An apparatus as defined in claim 11, wherein said magnet bar has a length designed so that when said sub-body slides down to completely cover said main body, only said second signal sensor may face said magnet bar, and said first signal sensor may not be affected by said magnetic field.

14. An apparatus as defined in claim 10, wherein said control unit recognizes the opening position of said sub-body sliding up if detecting the low signal from said first signal sensor and the high signal from said second signal sensor, and the closing position of said sub-body sliding down if detecting the high signal from said first signal sensor and the low signal from said second signal sensor.

15. An apparatus as defined in claim 10, wherein said signal generating element is made of a magnet bar producing a magnetic field, and said first and second signal sensors are made of Hall sensor elements with the same form, the same size and the same function.

16. A method for detecting an opening and a closing of a slide-type mobile terminal, which including a main body, a sub-body mounted on said main body, said sub-body being movable relative to said main body in a sliding manner between the open position where said sub-body slides up so as to expose a part of said main body and the closed position where said sub-body slides down to completely cover said main body, and a signal generating element provided in said sub-body for generating a magnetic field, the method comprising the steps of:

providing said main body with a first and a second signal sensor provided at two positions separated by a predetermined interval in said main body so as to face said signal generating element respectively when said sub-body slides up and down relative to said main body, said first and second signal sensors detecting said magnetic field;

determining whether a signal is received from said first signal sensor;

determining whether a signal is received from said second signal sensor if there is a signal received from said first signal sensor; and recognizing said mobile communication terminal being in one of a first position, a second position, and a transition position when there is a signal received from said second signal sensor, the first position corresponding to the sub-body fully slid up, the second position corresponding to the sub-body fully slid down, and the transition position being between the first and second positions.

17. A method as defined in claim 16, further comprising displaying a message for requiring the user to slide said sub-body completely up or down said main body after waiting for a predetermined time if there is no signal received from said second signal sensor.

18. A method as defined in claim 16, wherein said signal generating element is made of a magnet bar producing a magnetic field, and said first and second signal sensors are made of Hall sensor elements with the same form, the same size and the same function.

19. A method as defined in claim 18, wherein said magnet bar has a length designed so that when said sub-body slides up said main body, said first signal sensor only may face said magnet bar, and said second signal sensor may not be affected by said magnetic field.

20. A method as defined in claim 18, wherein said magnet bar has a length designed so that when said sub-body slides down to completely cover said main body, said second signal sensor only may face said magnet bar, and said first signal sensor may not be affected by said magnetic field.

* * * * *